(12) United States Patent
Rastogi (10) Patent No.: US 10,410,132 B2
(45) Date of Patent: Sep. 10, 2019

(54) PROBABILISTIC REMAINING USAGE LIFE OF AIRCRAFT STRUCTURES

(71) Applicant: HONEYWELL INTERNATIONAL INC., Morris Plains, NJ (US)

(72) Inventor: Mudit Rastogi, Brno (CZ)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 515 days.

(21) Appl. No.: 15/175,894

(22) Filed: Jun. 7, 2016

(65) Prior Publication Data

US 2017/0351966 A1    Dec. 7, 2017

(51) Int. Cl.
| | |
|---|---|
| *G01B 3/44* | (2006.01) |
| *G06N 7/00* | (2006.01) |
| *G01L 5/00* | (2006.01) |
| *G01M 99/00* | (2011.01) |
| *G06Q 10/00* | (2012.01) |

(52) U.S. Cl.
CPC ........... *G06N 7/005* (2013.01); *G01L 5/00* (2013.01); *G01M 99/00* (2013.01); *G06Q 10/20* (2013.01)

(58) Field of Classification Search
None
See application file for complete search history.

(56) References Cited

U.S. PATENT DOCUMENTS

| | | | |
|---|---|---|---|
| 8,725,456 B1 | 5/2014 | Saha et al. | |
| 9,785,919 B2 * | 10/2017 | Diwinsky | .............. G06Q 10/20 |
| 2005/0096873 A1 * | 5/2005 | Klein | ..................... G01H 1/006 |
| | | | 702/184 |
| 2007/0198215 A1 | 8/2007 | Bonanni et al. | |
| 2009/0240468 A1 | 9/2009 | Torng | |
| 2012/0209538 A1 | 8/2012 | Caicedo et al. | |
| 2014/0229149 A1 | 8/2014 | Guan et al. | |
| 2015/0233786 A1 | 8/2015 | Pieper et al. | |

(Continued)

FOREIGN PATENT DOCUMENTS

EP     1455313 A1    3/2004

OTHER PUBLICATIONS

EP Summons to Oral Proceedings for Application No. 17172911.4 dated Sep. 20, 2018.

(Continued)

*Primary Examiner* — Aditya S Bhat
(74) *Attorney, Agent, or Firm* — Lorenz & Kopf, LLP (57) ABSTRACT

Methods and systems are provided for condition-based maintenance of a structural component exhibiting a physical defect. One exemplary system comprises a measurement system to obtain a current measurement of a defect in a structure, a monitoring system, and a maintenance system. The monitoring system determines a probabilistic representation of degradation development data for the defect using the current measurement, determines a reference remaining usage life metric for the structure based on the probabilistic representation and a target probability value, and determines one or more remaining usage life bounds based at least in part on the reference remaining usage life metric. The maintenance system determines maintenance schedule or other remedial action(s) for the structure in a manner that is influenced by the reference remaining usage life metric and the one or more remaining usage life bounds.

19 Claims, 6 Drawing Sheets

(56) References Cited

U.S. PATENT DOCUMENTS

2015/0254908 A1 9/2015 Rodrigues
2016/0097699 A1 4/2016 Leao

OTHER PUBLICATIONS

Amin, Sanket et al., "Fuzzy Interference and Fusion for Health State Diagnosis of Hydraulic Pumps and Motors", IEEE, 2005, p. 13-18.
Ali, Tazid and Palash Dutta, "Methods to Obtain Basic Probability Assignment in Evidence Theory", International Journal of Computer Applications (0975-8887), vol. 38, No. 4, Jan. 2012, p. 46-51.
Kiciak, A., G. Glinka and D.J. Burns, "Calculation of Stress Intensity Factors and Crack Opening Displacements for Cracks Subjected to Complex Stress Fields", Transactions of the ASME, vol. 125, Aug. 2003, p. 260-266.
Moftakhar, A.A. and G. Glinka, "Calculation of Stress Intensity Factors by Efficient Integration of Weight Functions," Engineering Fracture Mechanics, vol. 43, No. 5, 1992, p. 749-756.
Karandikar, Jaydeep M., Nam Ho Kim, and Tony I. Schmitz, "Prediction of Remaining Useful Life for Fatigue—Damaged Structures Using Bayesian Interference", Engineering Fracture Mechanics 96, Sep. 15, 2012, 588-605.
Poe, C.C., "Stress-Intensity Factor for a Cracked Sheet with Riveted and Uniformly Spaced Stringers," NASA Technical Report, NASA TR R-358. May 1971.
Rice, J.R., "Elastic Fracture Mechanics Concepts for Interfacial Cracks", Transactions of the ASME, vol. 55, Mar. 1988, p. 98-102.
He, Wei, et al., "Prognostic of Lithium-Ion Batteries Based on Dempster-Shafer Theory and the Bayesian Monte Carlo Method", Journal of Power Sources 196, Aug. 2011, 10314-21.
Glinka, G. and G. Shen, "Universal Features of Weight Functions for Cracks in Mode I", Engineering Fracture Mechanics, vol. 40, No. 6, 1991, p. 1135-1146.
Tinga, Tiedo and Richard Loendersloot, "Aligning PHM, SHM and CBM by Understanding the Physical System Failure Behaviour", European Conference of the Prognostics and Health Management Society, 2014.
Extended EP Examination for Application No. 17172911.4 dated Jan. 30, 2018.
Extended EP Search Report for Application No. 17172911.4-1958 dated Aug. 1, 2017.
Rice, J.R., "Some Remarks on Elastic Crack-Tip Stress Fields." International Journal of Solid Structures, Aug. 1972, vol. 8, pp. 751-758.
Shen, G., Glinka, G. Determination of Weight Functions from Reference Stress Intensity Factures. Theoretical and Applied Fracture Mechanics, 1991, vol. 15(3), pp. 237-245.
Shen, G., Glinka, G. Weight Functions for a Surface Semi-Elliptical Crack in a Finite Thickness Plate, Theoretical and Applied Fracture Mechanics, 1991, vol. 15 (3), pp. 247-255.
Zheng, X.J., Glinka, G. Dubey, R. "Calculation of Stress Intensity Factors for Semi-Elliptical Cracks in a Thick Wall Cylinder." International Journal of Pressure Vessel and Piping, 1995, vol. 62 (3), pp. 249-258.
Zheng, X.J., Glinka, G., Dubey, R., Stress Intensity Factors and Weight Functions for a Corner Crack in a Finite Thickness Plate., Engineering Fracture Mechanics, 1996, vol. 54(1), pp. 49-62.
Wang, X., Lambert, S.B. "Stress Intensity Factors for Low Aspect Ratio Semi-Elliptical Surface Cracks in Finite-Thickness Plates Subjected to Non-Uniform Stress." Engineering Fracture Mechanics, 1995, vol. 51 (4), pp. 517-532.
Newman Jr, J.C., Prediction of Fatigue Crack Growth Under Variable-Amplitude and Spectrum Loading Using a Closure Model. Am Soc Test Mater STP, 1982, vol. 761, pp. 255-277.
Ray, A., Pantankar R.P., Fatigue Crack Growth Under Variable Amplitude Loading, Part 1, Applied Mathematical Modelling, 2001, vol. 25 (11), pp. 979-1013.
Ray, A., Pantankar R.P., Fatigue Crack Growth Under Variable Amplitude Loading, Part 2, Applied Mathematical Modelling, 2001, vol. 25 (11), pp. 995-1013.
Gebraeel, n., Lawley, M., Liu, R., and Parmeshwaran, V., Residual Life Predictions from Vibration-Based Degradation Signals: A Neural Net Approach, IEEE Transactions on Industrial Electronics, Jun. 2004, vol. 51, No. 3.
Goebel, K., Eklund, N., "Prognostic Fusion for Uncertainty Reduction." Proceedings of AIAA InfoTech@Aerospace Conference. Reston, VA: American Institute for Aeronautics and Astronautics, Inc., May 2007.
Bueckner, H.F., "A Novel Principle for the Computation of Stress Intensity Factors," Zeitschrift Fuer Angewandte Mathematik & Mechanik, 1970, 50, pp. 529-546.
Sankararaman, Shankar et al., Analytical Algorithms to Quantify the Uncertainty in Remaining Useful Life Prediction, IEEE, Jun. 2013, IEEAC Paper #2336, Version 1, p. 1-11.
Celaya, Jose R., Abhinav Saxene and Kai Goebel, Uncertainty Representation and Interpretation in Model-based Prognostic Algorithms based on Kalman Filter Estimation, Annual Conference of the Prognostics and Health Management Society 2012, p. 1-9.

\* cited by examiner

PROBABILISTIC REMAINING USAGE LIFE OF AIRCRAFT STRUCTURES

TECHNICAL FIELD

The subject matter described herein relates generally to structural analysis, and more particularly, embodiments of the subject matter relate to probabilistic predictions of remaining usage life for condition-based maintenance of aircraft structures exhibiting defects.

BACKGROUND

Due to costs and time requirements, it is desirable to minimize and selectively perform maintenance at intervals where the likely benefits outweigh the costs. At the same time, it is desirable to minimize the risks of performing maintenance too infrequently, particularly for mission critical applications. Therefore, a preventative maintenance approach is often adopted to regularly inspect components. However, scheduled preventive maintenance actions can undesirably increase costs, both in terms of labor and parts, while also undesirably preventing the use of the component being maintained.

Condition-based maintenance (or monitoring) (CBM) is a concept developed to reduce costs associated with preventative maintenance, where maintenance is ideally performed only on an as-needed basis in response to an indication of potential deterioration or degradation. However, practical implementation of CBM and prognostics health management (PHM) for many applications is difficult due to real-world uncertainties and complexities. For example, in the case of aircraft, a structural component may have a complex geometry, be riveted or interconnected with other structural components, and be subjected to varying and unpredictable loading. While various approaches have been developed to estimate remaining usage life (RUL), they generally tend to be overly simplistic and not extensible to complex structures, too conservative resulting in excess maintenance, or impractical for real-time prognostics applications, while also often failing to account for all potential sources of uncertainty.

BRIEF SUMMARY

Methods and systems are provided for determining remaining usage life of a structural component exhibiting a defect. One exemplary system includes a measurement system to obtain a current measurement of a defect in a structure and a maintenance system coupled to determine an action for the structure in a manner that is influenced by a reference remaining usage life metric and one or more remaining usage life limits, such as, for example, a physical inspection or other non-destructive testing, component replacement, or other maintenance actions. The maintenance system is coupled to a monitoring system, which, in turn, is coupled to the measurement system to determine a probabilistic representation of degradation development data for the defect based at least in part on the current measurement, a threshold value, and one or more stress intensity factors, determine the reference remaining usage life metric for the structure based on the probabilistic representation and a target probability value, and determine the one or more remaining usage life limits based at least in part on the reference remaining usage life metric.

In another exemplary embodiment, a method of monitoring a component having a physical defect is provided. The method involves determining degradation development data for the physical defect based at least in part on a current measurement of the physical defect, determining a probabilistic representation of the degradation development data based at least in part on a threshold value associated with the physical defect and uncertainty associated with the current measurement, determining a remaining usage life value for the component based on an input probability value and the probabilistic representation, determining one or more confidence limit values associated with the remaining usage life value, and providing the remaining usage life value and the one or more confidence limit values to a maintenance system.

In yet another embodiment, a method of monitoring an aircraft component is provided. The method involves obtaining, from a measurement system, a current measurement of a crack in the aircraft component, determining one or more stress intensity factors associated with the aircraft component based at least in part on a geometry of the aircraft component, determining a crack growth data set based on the current measurement and the one or more stress intensity factors, and determining a probabilistic representation of the crack growth data set based at least in part on the crack growth data set, a maintenance threshold for the crack, and uncertainty associated with at least one of the current measurement and the one or more stress intensity factors. The method continues by determining a remaining usage life value for an input probability value based on the probabilistic representation, determining one or more future uncertainty confidence limits for the remaining usage life value based at least in part on a future uncertainty adjustment factor and the remaining usage life value, and providing the remaining usage life value and the one or more future uncertainty confidence limits to a condition-based maintenance system, wherein a maintenance schedule for the aircraft component is influenced by the remaining usage life value and the one or more future uncertainty confidence limits.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein generally relate to systems and methods for determining probabilistic remaining usage life (RUL) metrics for structural components that account for both measurement uncertainties and future loading uncertainties. By improving accuracy and reliability of the RUL metrics, condition-based maintenance (CBM) can be more effectively utilized to schedule and perform maintenance on a structural component exhibiting damage, fatigue, or other degradation.

In exemplary embodiments, the subject matter is described herein in the context of aviation applications, where the structural component being analyzed is a structural member of an aircraft. In this regard, the structural component may be subjected to nonlinear stress fields due to riveting, geometric variations across a dimension of the component (e.g., thickness variations), and the like. Accordingly, exemplary embodiments described herein determine stress intensity factor(s) that account for rivet forces and other nonlinearities. The stress intensity factor(s) associated with a particular structural component are utilized in conjunction with a measurement of a mechanical defect, such as a measurement of a crack length, in the structural component to calculate or otherwise determine a degradation development data set representative of the future progression of the mechanical defect (e.g., a crack growth data set). The degradation development data set is then utilized to create a probabilistic representation of the mechanical defect determined based at least in part on the degradation development data and uncertainties associated with the measurement of the mechanical defect, the rivet forces, and/or other constituent parameters used to derive the degradation development data. RUL metrics are then determined for the structural component based on the probabilistic representation of the mechanical defect. In exemplary embodiments, uncertainty regarding future loading on the structural component is utilized to determine confidence intervals based on the probabilistic representation of the mechanical defect. Using the probabilistic representation and future loading confidence intervals, RUL metrics are determined for an input probability value and provided to a CBM system and/or output to a user interface to facilitate scheduling and performing maintenance on the structural component based on the RUL metrics.

Figure 1:
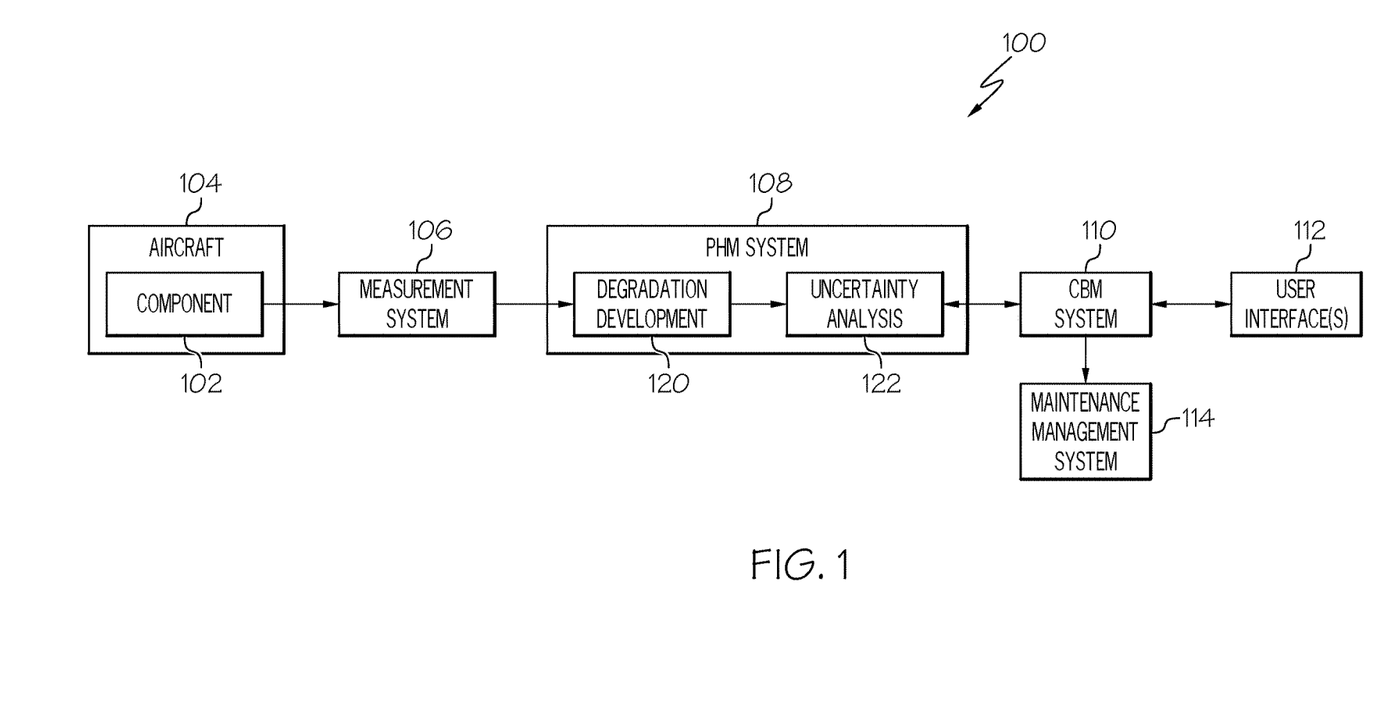
FIG. 1 is a block diagram of a system for inspecting or maintaining a structural component in an exemplary embodiment.

FIG. 1 depicts an exemplary embodiment of a system 100 for determining RUL metrics for a structural component 102 of a vehicle 104, such as an aircraft. The system 100 includes a measurement system 106 configured to measure, sense, or otherwise quantify a size of a physical defect in the structural component 102 and provide measurement data indicative of the current size of the physical defect to a prognostics health management (PHM) system 108. The PHM system 108 determines one or more RUL metrics for the component 102 based on the current measurement of the physical defect and provides the RUL metrics to a condition-based maintenance (CBM) system 110. In one or more embodiments, the RUL metrics are realized as a probabilistic representation of the RUL for the component 102 along with probabilistic confidence intervals based on the uncertainty in the future loading of the component 102 during subsequent operation of the aircraft 104 utilized by the CBM system 110 to determine RUL values for a desired probability value, which may be input or otherwise provided by a user via a user interface 112. In one embodiment, the CBM system 110 determines a maintenance schedule for the component 102 based on the RUL values and provides indication of the maintenance schedule to a maintenance management system 114, which, in turn, schedules or otherwise initiates performance of maintenance of the component 102 at times or intervals dictated by the maintenance schedule.

It should be appreciated that FIG. 1 depicts a simplified representation of the system 100 for purposes of explanation and ease of description, and FIG. 1 is not intended to limit the application or scope of the subject matter described herein in any way. In this regard, although FIG. 1 shows the various constituent systems 106, 108, 110, 114 of the system 100 as being implemented separately, in practice, one or more of the systems 106, 108, 110, 114 may be integrated with another one or more of the systems 106, 108, 110, 114. Furthermore, practical embodiments of the system 100 may include numerous other devices and components for providing additional functions and features, as will be appreciated in the art. Additionally, although the subject matter is described herein in the context of the structural component 102 being a constituent part of a vehicle 104, and in particular, an aircraft, the subject matter described herein is not necessarily limited to any particular type of vehicle, and moreover, is not limited to vehicles, and in practice, may be utilized with any structural or mechanical component of any machine or structure.

Still referring to FIG. 1, the measurement system 106 may include or otherwise utilize one or more measurement devices to obtain a current measurement of a physical defect, such as, for example, X-ray devices, fiber Bragg grating (FBG) sensors, microscopes, probes, wireless sensor networks, or other non-destructive measurement tools or testing devices capable of analyzing the structural component 102 to quantify or otherwise characterize the physical defect. The measurement system 106 and/or one or more of the measurement devices thereof may be communicatively coupled to the PHM system 108 via a communications network to transmit or otherwise provide measurement data indicative of the current size or state of a physical defect of the structural component 102 to the PHM system 108 via the network. That said, in alternative embodiments, measurement data indicative of the current size or state of a physical defect of the structural component 102 may be manually input or provided to the PHM system 108 by a user via a user interface.

As described in greater detail below in the context of FIGS. 2-3, the PHM system 108 includes or otherwise implements a degradation development module 120 that is configured to receive or otherwise obtain the measurement data from the measurement system 106 and determine degradation development data for the component 102 based at least in part on the measurement of the physical defect. In this regard, the degradation development data represents a prediction or prognostication of the progression of the physical defect in the future. For example, in one embodiment the physical defect is a crack in the structural component 102, where the degradation development module 120 determines a crack growth data set representing the predicted progression of the crack based on the current measurement of the crack length received from the measurement system 106 and the force or stress the component 102 is subjected to during operation of the aircraft 104. In this regard, in one embodiment, the degradation development module 120 calculates or otherwise determines one or more stress intensity factor values based on the physical geometry of the component 102 and the estimated loading on the component 102 during operation of the aircraft 104. Additionally, when the component 102 is riveted, the degradation development module 120 calculates or otherwise determines the rivet forces the component 102 is subjected to based on the crack length, which may also influence the stress intensity factor(s), as described in greater detail below. Starting with the current crack length measurement, the degradation development module 120 calculates or otherwise determines incremental amounts of growth in the crack length (or progression of the crack) on a per cycle (or other operating time interval) based on the preceding crack length measurement, the rivet forces corresponding to the preceding crack length measurement, and the stress intensity factors corresponding to those rivet forces until reaching a maintenance threshold (e.g., a replacement threshold, a repair threshold, or the like), resulting in a crack growth data set from the current crack length to the threshold crack length on a per cycle basis. The resulting amount of cycles (or time increments) required to reach the threshold crack length corresponds to an initial estimate of the RUL of the component 102.

The PHM system 108 also includes an uncertainty analysis module 122 that receives the degradation development data from the degradation development module 120 and calculates or otherwise determines a probabilistic representation of the degradation development data using the maintenance threshold, the uncertainty associated with the current measurement data received by the degradation development module 120 along with the uncertainty associated with the stress intensity factors, the rivet forces, the estimated loading, and any other variables or parameters utilized by the degradation development module 120 to calculate the progression of the physical defect. In this regard, the probabilistic representation represents the probability of the size of the physical defect exceeding the maintenance threshold after a certain number of cycles (or time intervals) of operation of the aircraft 104. Additionally, the uncertainty analysis module 122 utilizes the probabilistic representation of the degradation development data to determine future loading confidence intervals associated with the probabilistic representation based on the uncertainty in the future loading that the component 102 may be subjected to during future operation of the aircraft 104. Thus, the uncertainty analysis module 122 may output or otherwise provide a probabilistic representation of the degradation development data, along with upper and lower probabilistic representations of the degradation development data that represent the minimum or maximum likely RUL based on the potential variability in the future loading exerted on the component 102.

Still referring to FIG. 1, in one or more embodiments, the CBM system 110 receives or otherwise obtains the probabilistic representation of the degradation development data along with the probabilistic representations corresponding to the future loading confidence intervals, and based thereon, determines one or more RUL values for the component 102 for an input probability value, which may be received from a user via the user interface 112 and/or stored by the CBM system 110. In this regard, the RUL values may represent a minimum, a maximum, and a likely RUL for the component 102 for a desired probability level, that is, the minimum, maximum, and likely number of operating cycles (or time intervals) required before the physical defect progresses to the maintenance threshold for a desired probability (or level of certainty). Thus, for a higher probability that the physical defect will not violate the maintenance threshold, the number of operating cycles decreases, and vice versa. Using the minimum, maximum, and likely RUL values provided by the PHM system 108 (e.g., output from uncertainty analysis module 122), the CBM system 110 may calculate or otherwise determine a maintenance schedule for the component 102 in terms of future operating cycles, which, in turn may be utilized by the maintenance management system 114 to manage inventory and schedule subsequent inspections of the component 102 by the measurement system 106. In this regard, in some embodiments, the system 100 may emulate a closed-loop system with the current measurement data being updated by the measurement system 106 based on the maintenance schedule indicated or otherwise implemented by the maintenance management system 114 pursuant to the RUL values identified by the CBM system 110 for an input probability value. Thus, as the physical defect progresses at a faster or slower rate, the number of operating cycles between obtaining updated current measurement data using the measurement system 106 in a manner corresponding to the rate of progression.

Figure 2:
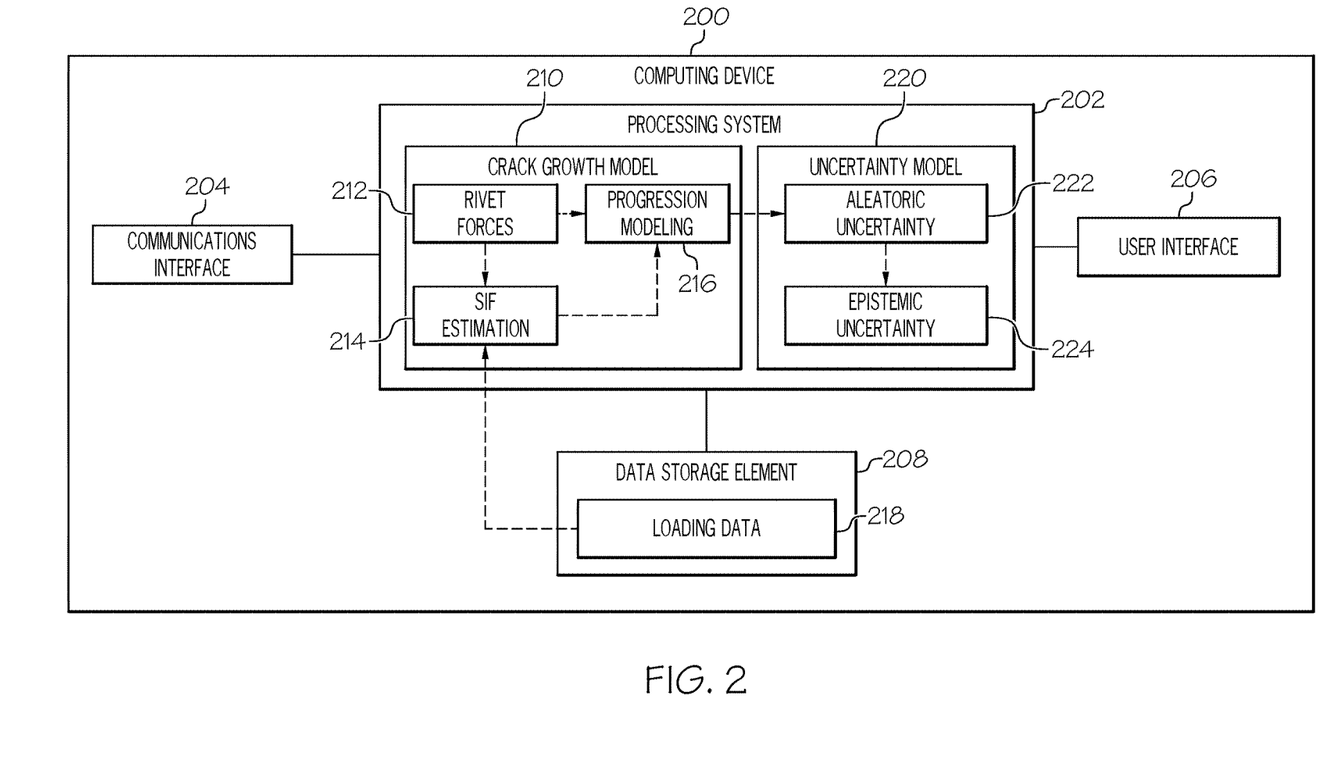
FIG. 2 is a block diagram of a computing device suitable for use as a prognostics health management system suitable for use in the system of FIG. 1 in an exemplary embodiment.

FIG. 2 depicts an exemplary embodiment of a computing device 200 suitable for use as the PHM system 108 in the system 100 of FIG. 1. That said, one or more of the other systems 106, 110, 114 in the system 100 of FIG. 1 may be similarly implemented using another instance of the computing device 200 suitably configured to support or otherwise perform the functionality of the respective system 106, 110, 114 as described herein. The computing device 200 includes, without limitation, a processing system 202 coupled to one or more input/output interfaces 204, 206 and a data storage element 208.

The illustrated computing device 200 includes a communications interface 204, which generally represents the hardware, circuitry, and/or other components of the computing device 200 that are coupled to the processing system 202 and configured to support communications between the computing device 200 and one or more external devices or systems (e.g., measurement system 106 and/or CBM system 110). Depending on the embodiment, the communications interface 204 may be configured to support wired and/or wireless communications, and may include any number of transmitters, receivers, transceivers, and the like.

The illustrated computing device 200 also includes a user interface 206, which generally represents the hardware, circuitry, and/or other components of the computing device 200 that are coupled to the processing system 202 and configured to support communications with a human user, for example, by receiving information from and/or presenting information to the user. The user interface 206 may include at least one input user interface element, such as, for example, a button, a keypad, a keyboard, a knob, a joystick, a mouse, a touch panel, a touchscreen, a microphone or another audio input device, and/or the like for receiving input information from the user. Additionally, the user interface 206 may include at least one output user interface element, such as, for example, a display element (e.g., a light-emitting diode or the like), a display device (e.g., a liquid crystal display or the like), a speaker or another audio output device, a haptic feedback device, or the like, for providing notifications or other information to the user.

The processing system 202 generally represents the hardware, circuitry, processing logic, and/or other components of the computing device 200 configured to support operation of the computing device 200. Depending on the embodiment, the processing system 202 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In the illustrated embodiments, the processing system 202 includes processing logic that may be configured to facilitate, support, or otherwise perform one or more of the processes, tasks and/or functions described herein in the context of the PHM system 108. The steps of a method or algorithm described in connection with the embodiments disclosed herein may be embodied directly in hardware, in firmware, in a software module executed by the processing system 202, or in any practical combination thereof. For example, in accordance with one or more embodiments, the processing system 202 includes or otherwise accesses the data storage element 208, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 202, cause the processing system 202 to execute and perform one or more of the processes, tasks, operations, and/or functions described herein. In the illustrated embodiment, the programming instructions, when read and executed, cause the processing system 202 to create, generate, or otherwise facilitate a crack growth modeling application 210 (e.g., degradation development module 120) that generates a degradation development data set for a crack in a structural component and an uncertainty modeling application 220 (e.g., uncertainty analysis module 122) that generates probabilistic representations of the degradation development data set.

As described in greater detail below in the context of FIG. 3, the crack growth modeling application 210 includes a rivet forces module 212 that calculates or otherwise determines estimated minimum and maximum rivet forces exerted on the structural component under analysis based on an input crack length and the geometric characteristics of the structural component, such as, for example, the location of the crack, the thickness or other dimensions of the structural component, the location(s) of rivets along the structural component, and the like. The crack growth modeling application 210 also includes a stress intensity estimation module 214 that calculates or otherwise determines estimated minimum and maximum stress intensity factors for the physical stress the structural component under analysis is subject to during operation based on an input crack length, the rivet forces output by the rivet forces module 212, and loading data 218 associated with the structural component that is stored or otherwise maintained by the data storage element 208. In exemplary embodiment, the loading data 218 is realized as data that characterizes the loading forces exerted on the structural component during one or more cycles of operation, which can be utilized to identify or otherwise determine the estimated minimum and maximum stress the structural component is likely to be subjected to during a cycle of operation. The crack growth modeling application 210 also includes a progression modeling module 216 that calculates or otherwise determines an estimated incremental crack growth for a next subsequent operating cycle based on the minimum and maximum rivet forces and the estimated minimum and maximum stress values. The incremental crack growth is utilized to update the input crack length to the rivet forces module 212 for determining the incremental crack growth for the next subsequent operating cycle until the crack length reaches a maintenance threshold (which may be stored or maintained in the data storage element 208 in association with the structural component identifier). The resulting set of crack lengths (or incremental crack growth amounts) may be stored or otherwise maintained in the data storage element 208 in association with the operating cycle increments resulting in a crack growth data set representing the estimated progression of the crack length with respect to subsequent operating cycles until the maintenance threshold crack length is reached.

As described in greater detail below in the context of FIG. 4, the uncertainty modeling application 220 includes an aleatoric uncertainty module 222 that calculates or otherwise determines a probabilistic representation of the crack growth progression that accounts for uncertainty or variances associated with the current crack length measurement, the rivet forces, the stress intensity factors, the loading data 218, and other parameters of the crack growth models that influence the estimated incremental crack growth. In this regard, the probabilistic representation represents the relative probability that the crack length will not have progressed beyond the maintenance threshold after a certain number of subsequent operating cycles of the aircraft 104. Thus, for an input probability value, the aleatoric uncertainty module 222 outputs or otherwise provides a remaining usage life value corresponding to the number of subsequent operating cycles of the aircraft 104 at which point the crack length is likely to have progressed beyond the maintenance threshold with the input probability value. In other words, an input probability value of 99% results in a number of subsequent operating cycles after which the crack length is likely to have exceeded the maintenance threshold only 1% of the time or less.

The uncertainty modeling application 220 also includes an epistemic uncertainty module 224 that calculates or otherwise determines confidence limits (or bounds) for the RUL output value provided by the aleatoric uncertainty module 222. In this regard, the confidence limits represent likely minimum and maximum RUL values with a desired level of confidence in a manner that accounts for future uncertainty with respect to the loading on the component 102 or potentially other operational variables (e.g., environmental conditions or the like) which are not captured by the aleatoric uncertainty module 222. In exemplary embodiments, a future uncertainty adjustment factor is used to determine minimum and maximum RUL bounds based on the likely RUL value for the input probability value that is output by the aleatoric uncertainty module 222. In this regard, the value of the future uncertainty adjustment factor may account for the uncertainty in the future loading or other environmental or operational stressors that could influence progression of the crack in the component 102. In exemplary embodiments, the resultant minimum and maximum RUL bounds function as fuzzy number bounds which are then utilized to perform probability assignments within the fuzzy number range and arrive at minimum and maximum RUL confidence limits for an input confidence level.

Figure 3:
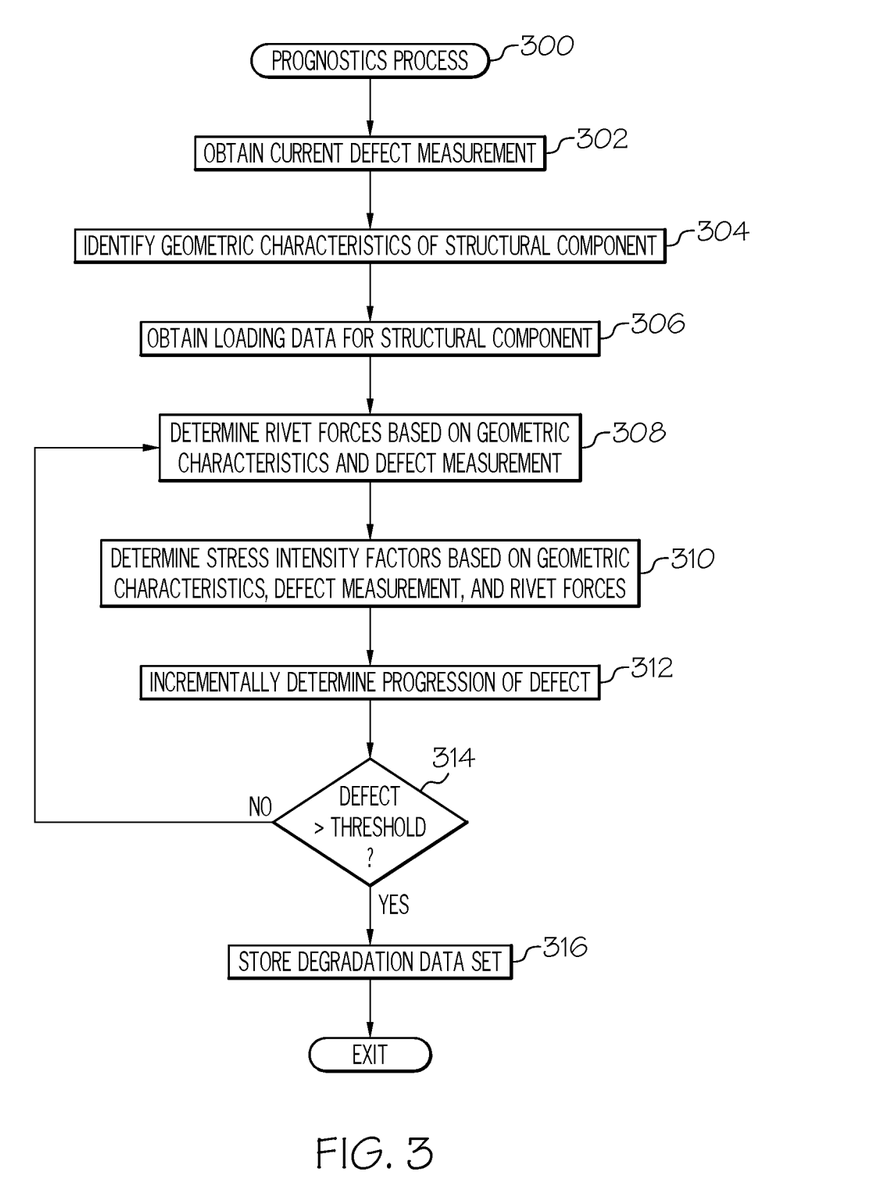
FIG. 3 is a flow diagram of an exemplary prognostics process suitable for use with the system of FIG. 1 in accordance with one or more embodiments.

Referring now to FIG. 3, in an exemplary embodiment, a prognostics process 300 is performed to estimate, predict, or otherwise project the development of a physical defect in the structural component 102 in the future based on a current measurement of the physical defect and perform additional tasks, functions, and operations described below. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. That said, for purposes of explanation, the prognostics process 300 may be primarily described in the context of the PHM system 108, 200, the degradation development module 120, the crack growth modeling application 210, the rivet forces module 212, the stress intensity estimation module 214, and/or the progression modeling module 216. It should be appreciated that the prognostics process 300 may include any number of additional or alternative tasks, the tasks need not be performed in the illustrated order and/or the tasks may be performed concurrently, and/or the prognostics process 300 may be incorporated into a more comprehensive procedure or process having additional functionality not described in detail herein. Moreover, one or more of the tasks shown and described in the context of FIG. 3 could be omitted from a practical embodiment of the prognostics process 300 as long as the intended overall functionality remains intact.

The prognostics process 300 begins by receiving or otherwise obtaining a current measurement of a physical defect in a structural component to be analyzed and identifying or otherwise determining the geometric characteristics of the structural component (task 302, 304). In this regard, the degradation development module 120 and/or the crack growth modeling application 210 receives or otherwise obtains, either from the measurement system 106 or directly from a user, an input indicative of the current measurement of a physical defect in the component 102 along with other information identifying the geometric characteristics of the component 102. Depending on the embodiment, the information identifying the geometric characteristics of the component 102 may be directly received by the PHM system 108, 200 from the measurement system 106 or user input, or alternatively, the PHM system 108, 200 may receive information identifying the type of structural component being analyzed, the type of aircraft 104 (e.g., make and/or model) the structural component 102 belongs to, the location of the structural component 102 on the aircraft 104, and/or other identifying information that enables the PHM system 108, 200 to determine the geometric characteristics of the structural component 102. For example, the data storage element 208 may store or otherwise maintain a lookup table that maintains an association between different types of structural components, aircraft, and other parameters, which, in turn, may be utilized by the degradation development module 120 and/or the crack growth modeling application 210 to identify the geometric characteristics of the component 102 under analysis.

The prognostics process 300 continues by obtaining loading data associated with the component under analysis, calculating or otherwise determining one or more rivet force metrics associated with the component based on the defect measurement and the component geometric characteristics, and calculating or otherwise determining one or more stress intensity metrics associated with the component based on the defect measurement, the component geometric characteristics, and the rivet force metric(s) (tasks 306, 308, 310). In exemplary embodiments, the loading data 218 associated with the component 102 under analysis is stored or otherwise maintained in the data storage element 208 and corresponds to a typical (or reference) loading sequence for the structural component 102 that is determined or otherwise derived based on a typical flight spectrum for the particular type of aircraft 104. Depending on the embodiment, the loading data 218 may be empirically obtained (e.g., based on sensors or other devices or systems onboard an aircraft during one or more flights) or determined by simulating operation of the aircraft 104. For example, in one embodiment, operation of the aircraft 104 is simulated for a number of flights (or cycles), where each flight includes a plurality of different constant amplitude ground loads and a plurality of different vertical and horizontal gusts, with the number and/or duration of the different loadings being constant or variable from one flight to the next. Based on the loading data 218, maximum and minimum averaged value of loading stress exerted on the cross-section of the component 102 containing the physical defect can be determined.

For an embodiment where the physical defect is a crack in a riveted component 102, the rivet forces are determined by the rivet forces module 212 determining equations for the displacement in the component 102 bidirectionally between respective pairs of different rivet locations due to the crack and equating equations to obtain a set of simultaneous equations that can be solved for unknown rivet forces. In this regard, the displacements at the rivet locations in a structure (e.g., a stringer, aircraft skin, or the like) stringers are equal, such that at any particular rivet location, the displacements due to uniaxial force plus the forces associated with remaining rivets can be calculated for each structural element. The forces can then be equated to obtain a set of simultaneous equations that can be solved for all the unknown rivet forces as a function of the current crack measurement.

For a crack in a riveted component 102 that is subjected to nonlinear stress with complex geometric characteristics, one or more stress intensity factors may be calculated using the equation $$K = \int_0^a \sigma(x) m(x, a) dx,$$

where a is the crack length, $\sigma(x)$ is the stress distribution determined based on the loading data 218 and the rivet forces, and $m(x,a)$ is a weighting function for the geometry of the component 102, where K is the stress intensity factor value. In an exemplary embodiment, minimum and maximum stress intensity factor values are determined by substituting the respective minimum and maximum averaged value of loading stress for $\sigma(x)$. In one embodiment, the weighting function is governed by equation $$m(x, a) = \frac{2}{\sqrt{2\pi\left(1 - \frac{x}{a}\right)}} \left[1 + M1\sqrt{\left(1 - \frac{x}{a}\right)} + M2\left(1 - \frac{x}{a}\right) + M3\left(1 - \frac{x}{a}\right)^{3/2}\right],$$

where M1, M2 and M3 are constants determined based on the geometrical characteristics of the component 102.

Still referring to FIG. 3, after determining rivet forces and stress intensity factors, the prognostics process 300 continues by calculating or otherwise determining an estimated amount of incremental progression of the physical defect over a subsequent operating cycle (task 312). Continuing the above example, using the minimum and maximum stress intensity factor values, the progression modeling module 216 determines the incremental growth in the crack in the component 102 over a subsequent operating cycle of the aircraft 104 using a predictive model of crack growth (e.g., prediction model for fatigue crack growth (PREFFAS)) and the Elber concept. When the estimated defect size after the next subsequent operating increment is less than the maintenance threshold (task 314), the prognostics process 300 repeats the loop defined by tasks 308, 310, 312 and 314 until the defect size reaches the maintenance threshold. In this regard, the prognostics process 300 may estimate or otherwise project the growth of a crack in the component 102 from its currently measured length incrementally on a per-cycle basis until the sum of the current crack length measurement and the incremental advances reaches the maintenance threshold for a crack in the component 102, resulting in a number of operating cycles by the aircraft 104 until the component 102 is projected to need replacement or other maintenance, i.e., the remaining usage life. For each subsequent cycle, updated stress intensity factors are determined based on the updated crack length $$\left(e.g., K_i = \int_0^{a+\Delta a_i} \sigma(x) m(x, a + \Delta a_i) dx\right),$$

and the rivet forces may be updated based on the updated crack length in a similar manner. Once the prognostics process 300 has projected the defect development out until reaching the maintenance threshold, the prognostics process 300 stores or otherwise maintains the corresponding degradation development data set (task 316), which maintains associations between estimated crack lengths after each subsequent operating cycle in the future after the current measurement state.

Figure 4:
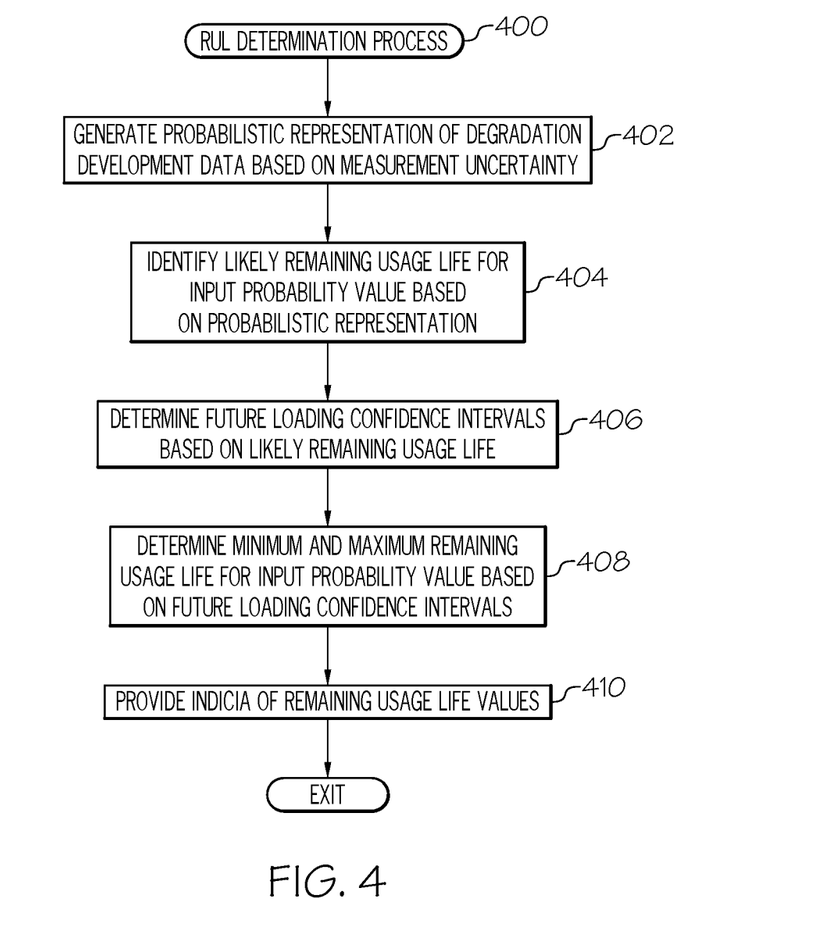
FIG. 4 is a flow diagram of an exemplary remaining usage life (RUL) determination process suitable for use with the system of FIG. 1 in conjunction with the prognostics process of FIG. 3 in accordance with one or more embodiments.

Referring now to FIG. 4, in an exemplary embodiment, a RUL determination process 400 is performed to determine metrics indicative of the RUL of a structural component exhibiting a physical defect based on an estimated or predicted progression of the defect in the future. The various tasks performed in connection with the illustrated process 400 may be implemented using hardware, firmware, software executed by processing circuitry, or any combination thereof. For illustrative purposes, the following description may refer to elements mentioned above in connection with FIGS. 1-2. That said, for purposes of explanation, the RUL determination process 400 may be primarily described in the context of the PHM system 108, 200, the uncertainty analysis module 122, 220 the aleatoric uncertainty module 222, and/or the epistemic uncertainty module 224. It should be appreciated that the RUL determination process 400 may include any number of additional or alternative tasks, the tasks need not be performed in the illustrated order and/or the tasks may be performed concurrently, and/or the RUL determination process 400 may be incorporated into a more comprehensive procedure or process having additional functionality not described in detail herein. Moreover, one or more of the tasks shown and described in the context of FIG. 4 could be omitted from a practical embodiment of the RUL determination process 400 as long as the intended overall functionality remains intact.

The RUL determination process 400 calculates, determines, or otherwise generates a probabilistic representation of the degradation development data that accounts for uncertainty associated with the defect measurement and other input parameters (task 402). In exemplary embodiments, the uncertainty module 122, 220 and/or the aleatoric uncertainty module 222 generates a plurality of degradation development data sets (or curves) based on the joint distribution of the current measurement of the physical defect from the measurement system 106, the weighting function m(x) (or its constituent variables M1, M2 and M3), and the rivet forces. In this regard, one a current crack length measurement is available, the prognostics process 300 may be repeated n number of times across the joint distribution for the potential range of the true crack length (e.g., the current crack length measurement value plus or minus the measurement tolerance of the measurement system 106) and the other crack growth model parameters. The resulting development data sets provide the prior probability distribution for the crack growth when applying Bayesian Inference.

In the context of crack growth, Bayes' rule can be written as $$P(\text{curve} = \text{true crack growth curve}/SHM \text{ result}) =$$
$$\frac{P(SHM \text{ result curve} = \text{true crack growth curve})}{P(SHM result)} \times$$
$$P(\text{curve} = \text{true crack growth curve}),$$

where P(curve=true crack growth curve) is the prior probability, which as described above is simply 1/n for each sample crack growth data set. P(SHM result/curve=true crack growth curve) represents the likelihood, P(SHM result) represents the normalization constant and P(curve=true crack growth curve/SHM result) represents the posterior probability that the given curve is true crack growth curve given a SHM result at any time. In this way, Bayes' rule can be used to update the probability that a sample curve is the true crack growth curve each time after updated defect measurements are provided to the model. Eventually the posterior calculated at a given time becomes the prior for the next time step. The likelihood function (P(SHM result/curve=true crack growth curve)) takes into account the measurement uncertainty and may be expressed as: $e^{-(a-a_{meas})^2/k}$, where $a_{meas}$ is the current or most recent crack growth measurement, a is the crack size for a sample crack growth data set at a respective number of program cycles, and k is a parameter that describes the function spread. The likelihood function can expressed as a non-normalized normal distribution, where the parameter $k=2\sigma^2$ and $\sigma$ is the standard deviation of crack length (due to measurement, material, and model uncertainty). In one or more embodiments, the value of k is input or otherwise provided by the user. The posterior distribution of the crack length is calculated by multiplying the prior distribution by the likelihood function.

Figure 5:
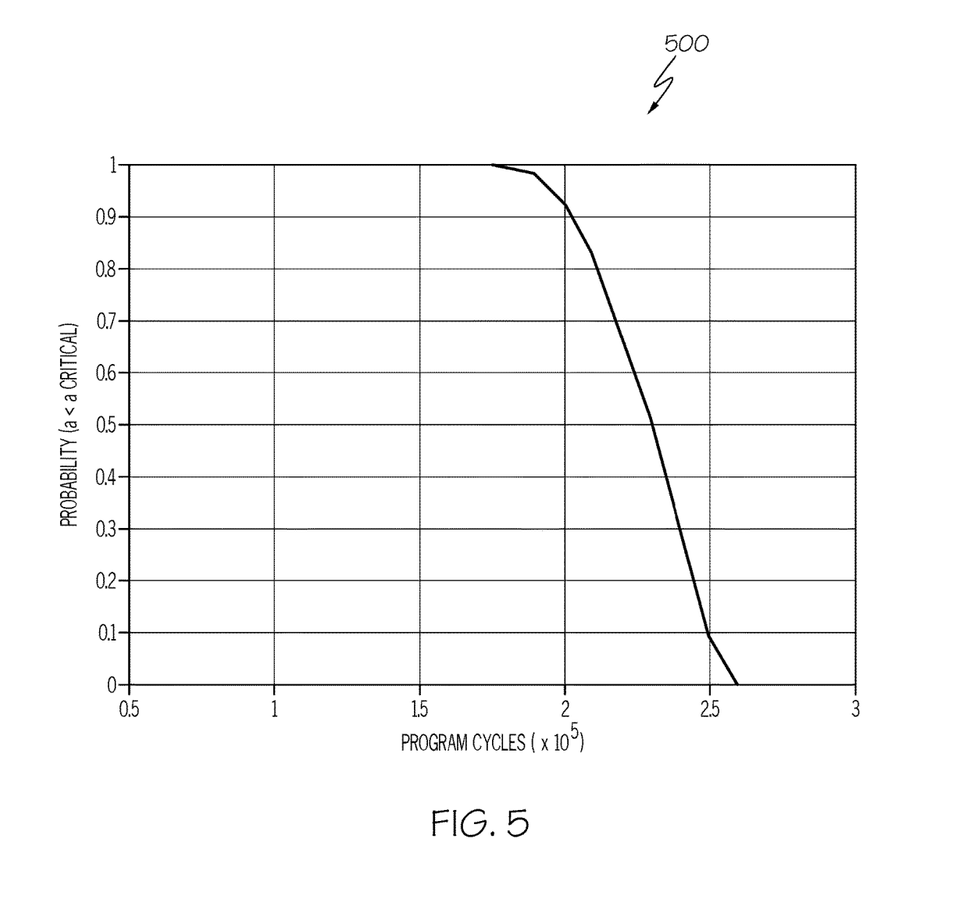
FIG. 5 is a chart depicting a probabilistic representation of degradation development data for a physical defect in a structural component in accordance with an exemplary embodiment of the RUL determination process of FIG. 4.

Based on the posterior distributions of the crack length data sets and the maintenance threshold value for the crack length, a probabilistic representation of the crack length with respect to operating cycles (or time) is determined. In this regard, the probabilistic representation represents the likelihood (or probability) that the crack length will be less than the maintenance threshold after a given number of operating cycles (or time) into the future. FIG. 5 depicts an exemplary embodiment of a probabilistic representation 500 of crack length.

Still referring to FIG. 4, the RUL determination process 400 identifies or otherwise determines a likely RUL for the structural component for a targeted probability value based on the probabilistic representation (task 404). In this regard, a user may input or otherwise provide a desired probability value or level that the user would like to utilize for purposes of making condition-based maintenance decisions. Based in the input probability value, the uncertainty module 122, 220 and/or the aleatoric uncertainty module 222 identifies or otherwise determines a corresponding RUL for the component 102 associated with that input probability value. For example, referring again to FIG. 5, for an input probability value of 99%, the RUL for the component 102 may be identified as $1.75\times10^5$ cycles based on the probabilistic representation 500.

Based on the likely RUL metric for a targeted probability value, the RUL determination process 400 continues by calculating or otherwise determining additional RUL metrics that account for uncertainty in the future loading that the structural component will be subjected to (task 406). In exemplary embodiments, the uncertainty module 122, 220 and/or the epistemic uncertainty module 224 determines upper and lower RUL values that represent future loading confidence intervals associated with the probabilistic representation of the degradation development. In one embodiment, triangular fuzzy number concepts are utilized to determine minimum and maximum RUL metrics based on the most likely RUL for the input probability value. To define the bounds of the triangular fuzzy number, the likely RUL for the input probability value may be adjusted, for example, by being multiplied and scaled up or down by a future loading uncertainty factor that corresponds to or otherwise represents the likely variability, variance, or other expected characteristics of the future loading relative to the loading data 218 utilized to create the degradation development data. In other embodiments, the scaling factor may correspond to a level of confidence in the likely RUL. The value of the future uncertainty factor may also account for the likely variability, variance, or other uncertainties in the future operating environment of the aircraft 104, for example, to account for future meteorological uncertainty or the like.

For example, continuing the above example from FIG. 5, the likely RUL of $1.75\times10^5$ cycles may be scaled up or down by 25% to provide a minimum and maximum RUL values for the triangular fuzzy number range of $1.3125\times10^5$ and $2.1875\times10^5$. The RUL parameter can then be expressed as a triangular fuzzy number based on the minimum and maximum RUL values with the most likely value in the center. Assuming n number of equally spaced $\alpha$ cuts provides n nested intervals, which are focal elements having a basic probability assignment of 1/n. The focal elements are given by the alpha-cut as $^{\alpha}A_i=\{x: \mu(x)\geq\alpha_i\}=[^{\alpha}A_{ilower}, ^{\alpha}A_{iupper}]$, (i=1, 2, 3 . . . , n), where $\alpha\in[0,1]$. The basic probability assignment can be calculated by first integrating the membership function between different $\alpha$ cuts ($\int_{\alpha Ailower}^{\alpha Aiupper}\mu(x)dx$) then normalizing the basic probability assignment for $^{\alpha}A_i$ using equation $$M(^{\alpha}A_i) = \frac{\int_{\alpha Ailower}^{\alpha Aiupper}\mu(x)dx}{\sum_i \int_{\alpha Ailower}^{\alpha Aiupper}\mu(x)dx}.$$

Using the RUL fuzzy number A=[$1.3125\times10^5$, $1.75\times10^5$, $2.1875\times10^5$], each value can be assigned a number between 0 and 1, which indicates the degree or grade of membership in the set, from which the basic probability assignment can be calculated. For the given example, the basic probability assignment can be calculated for different alpha cuts for a given membership function. From the resulting basic probability assignments and the corresponding RUL focal element intervals, upper and lower bounds of a confidence interval can be determined. For example, in one embodiment, different alpha cuts ($\alpha0=1$, $\alpha1=0.8$, $\alpha2=0.6$, $\alpha3=0.4$, $\alpha4=0.2$, $\alpha5=0$) result in different sets of corresponding focal elements ([1.7175, 1.7875], [1.6325, 1.8675], [1.5525, 1.9475], [1.4725, 2.0275], [1.3925, 2.1075], [1.3125, 2.1875]) having associated basic probability assignments (0.039, 0.111, 0.168, 0.208, 0.232, 0.240). The future loading confidence interval contains the precise probability of a set of interest and is bounded by two non-additive continuous measures called belief and plausibility, bel(A)≤P(A)≤pl(A), where the belief bel(A) for a set A is defined as the sum of all the masses of subsets of the set of interest, $$bel(A) = \sum_{B|B \subseteq A} m(B).,$$

and the plausibility pl(A) is the sum of all the masses of the sets B that intersect the set of interest A, $$pl(A) = \sum_{B|B \cap A \neq 0} m(B).,$$

Figure 6:
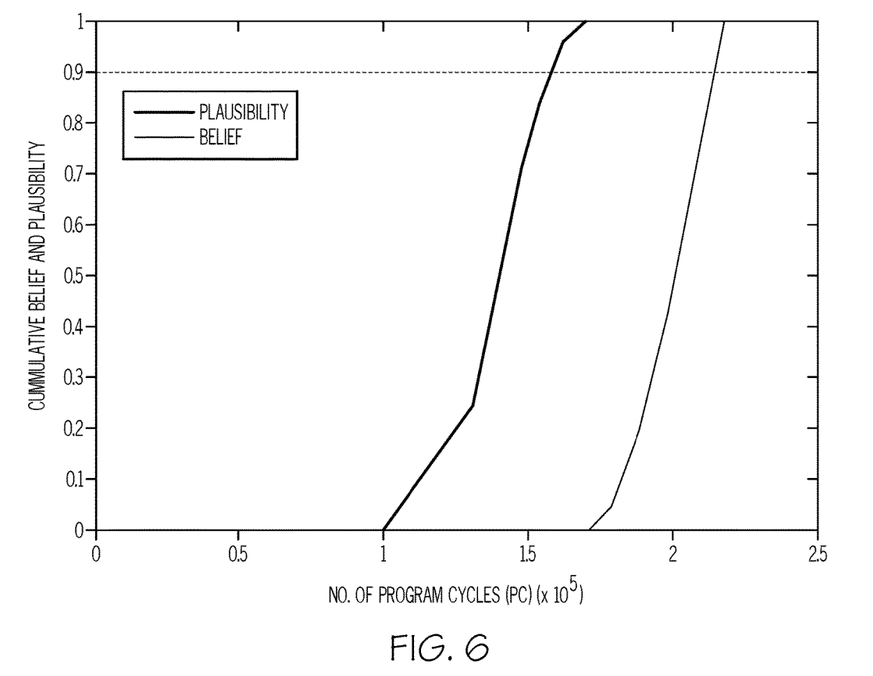
FIG. 6 is a chart depicting future uncertainty confidence intervals associated with the probabilistic representation of FIG. 5 in accordance with an exemplary embodiment of the RUL determination process of FIG. 4.

FIG. 6 depicts an exemplary embodiment of the lower future loading confidence interval represented by the plausibility function and the upper future loading confidence interval represented by the belief function.

Referring again to FIG. 4, the RUL determination process 400 calculates or otherwise determines minimum and maximum RUL values for the input probability value based on the future loading confidence intervals and generates, outputs, or otherwise provides indicia of the RUL metrics to a condition-based maintenance system, a user, or the like (tasks 408, 410). In this regard, a user may also input or otherwise provide a desired confidence value or level that the user would like to associate with the likely RUL value for purposes of making condition-based maintenance decisions in a manner that accounts for future loading uncertainty, measurement uncertainty, and model parameter uncertainty. For example, referring to FIG. 6, for an input confidence level of 90%, the uncertainty module 122, 220 and/or the epistemic uncertainty module 224 may determine a minimum RUL value of $1.58\times10^5$ cycles and a maximum RUL value of $2.11\times10^5$ cycles. The PHM system 108, 200 may then output or otherwise provide the likely RUL ($1.75\times10^5$) and the minimum and maximum RUL values corresponding to the probabilistic RUL range ($1.58\times10^5$, $2.11\times10^5$) to the CBM system 110 for further processing and/or analysis. In this regard, the CBM system 110 may perform one or more algorithms to schedule future maintenance or inspection of the structural component 102 based on the set of RUL metrics received from the PHM system 108, 200. In some embodiments, the PHM system 108, 200 and/or the CBM system 110 may also display or otherwise provide indicia of the RUL metrics to a user, for example, via a user interface 112, 206, thereby allowing a user to manually review the RUL information, adjust the input probability value and/or input confidence levels, or take other action.

By virtue of the subject matter described herein, the RUL of a structural component may be more reliably determined in a manner that accounts for measurement or other model parameter uncertainty as well as uncertainties in future loading of the component, or further, the impact of other unknown operating environment variables. Improving the accuracy and reliability of the RUL allows for cost effective inspection and maintenance of the component to be performed without having to compensate for uncertainty by conservatively overperforming inspections, maintenance and/or replacements.

For the sake of brevity, conventional techniques related to structural component monitoring, maintenance, and inspections, Bayesian statistics, Dempster-Schafer theory, and other aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A system comprising:
   a measurement system to obtain a current measurement of a physical defect in a structure;
   a monitoring system coupled to the measurement system to determine a plurality of degradation development data sets for the physical defect based at least in part on the current measurement of the physical defect, uncertainty associated with the current measurement, and one or more stress intensity factors by varying one or more of the current measurement and the one or more stress intensity factors, determine a probabilistic representation of the physical defect based on distributions of the plurality of degradation development data sets for the physical defect and a maintenance threshold associated with the physical defect, determine a reference remaining usage life metric for the structure based on the probabilistic representation and a target probability value, and determine one or more remaining usage life limits based at least in part on the reference remaining usage life metric; and
   a maintenance system coupled to the monitoring system to determine a maintenance schedule for the structure in a manner that is influenced by the reference remaining usage life metric and the one or more remaining usage life limits.

2. The system of claim 1, further comprising a user interface coupled to the monitoring system, wherein the monitoring system receives the target probability value via the user interface.

3. The system of claim 2, wherein the monitoring system receives a confidence level via the user interface and determines the one or more remaining usage life limits based on the confidence level and the reference remaining usage life metric.

4. The system of claim 1, wherein the one or more stress intensity factors are influenced by geometric characteristics of the structure and loading data for the structure.

5. The system of claim 4, further comprising a user interface coupled to the monitoring system, wherein the monitoring system receives indicia of the geometric characteristics via the user interface.

6. The system of claim 1, wherein the monitoring system determines minimum and maximum fuzzy number limits based on the reference remaining usage life metric and a future loading uncertainty factor and determines the one or more remaining usage life limits based at least in part on the reference remaining usage life metric and the minimum and maximum fuzzy number limits.

7. The system of claim 1, wherein the structure comprises a structural component of an aircraft.

8. A method of monitoring a component having a physical defect, the method comprising:
   determining a plurality of degradation development data sets for the physical defect based at least in part on a current measurement of the physical defect, uncertainty associated with the current measurement, and one or more stress intensity factors by varying one or more of the current measurement and the one or more stress intensity factors;
   determining a probabilistic representation of the plurality of degradation development data sets based at least in part on a maintenance threshold associated with the physical defect, wherein the probabilistic representation represents a probability of the physical defect exceeding the maintenance threshold with respect to subsequent operating cycles;

determining a remaining usage life value for the component based on an input probability value and the probabilistic representation;

determining one or more confidence limit values associated with the remaining usage life value; and providing the remaining usage life value and the one or more confidence limit values to a maintenance system, wherein a maintenance schedule for the component determined by the maintenance system is influenced by the remaining usage life value and the one or more confidence limit values.

9. The method of claim 8, wherein determining the plurality of degradation development data sets comprises predicting development of the physical defect based at least in part on the current measurement and one or more stress intensity factors associated with the component.

10. The method of claim 9, further comprising determining the one or more stress intensity factors based on geometric characteristics of the component and loading data associated with the component.

11. The method of claim 10, further comprising:
determining a stress distribution function based on the loading data;
determining a weighting function based on the geometric characteristics; and
determining the one or more stress intensity factors as an integral of a product of the stress distribution function and the weighting function over the current measurement.

12. The method of claim 8, further comprising determining rivet forces on the component based at least in part on the current measurement, wherein determining the plurality of degradation development data sets comprises predicting development of the physical defect based at least in part on the current measurement, the one or more stress intensity factors, and the rivet forces.

13. The method of claim 8, further comprising receiving the input probability value via a user interface, wherein the remaining usage life value comprises a value of the probabilistic representation at the input probability value.

14. The method of claim 8, wherein determining the one or more confidence limit values comprises:
determining fuzzy number bounds based on the remaining usage life value and a future uncertainty adjustment factor;
performing probability assignments based on the fuzzy number bounds; and
determining the one or more confidence limit values as minimum and maximum remaining usage life values for a confidence level based on the probability assignments.

15. The method of claim 8, further comprising receiving the current measurement of the physical defect from a measurement system, wherein the measurement system includes one or more measurement devices configured to analyze the component obtain the current measurement of the physical defect.

16. A computer-readable medium having computer-executable instructions stored thereon that, when executed by a processing system, cause the processing system to perform the method of claim 8.

17. The method of claim 8, wherein the remaining usage life value comprises a number of subsequent operating cycles at which point the physical defect will have progressed beyond the maintenance threshold with the input probability value.

18. The method of claim 8, further comprising determining minimum and maximum fuzzy number limits based on the remaining usage life value and a future loading uncertainty factor, wherein the one or more confidence limit values associated with the remaining usage life value are determined based at least in part on the minimum and maximum fuzzy number limits and the one or more confidence limit values account for future uncertainty with respect to loading on the component.

19. A method of monitoring an aircraft component, the method comprising:
obtaining, from a measurement system, a current measurement of a crack in the aircraft component;
receiving an input probability value and an input confidence level via a user interface;
determining a stress distribution function based on loading data associated with the aircraft component;
determining a weighting function based on the geometry of the aircraft component;
integrating a product of the stress distribution function and the weighting function over the current measurement to obtain one or more stress intensity factors;
determining a crack growth data set based on the current measurement and the one or more stress intensity factors;
determining a plurality of crack growth data sets across a joint distribution of the current measurement and the one or more stress intensity factors;
determining a probabilistic representation of the crack growth data set based on the plurality of crack growth data sets and a maintenance threshold for the crack, and uncertainty associated with at least one of the current measurement and the one or more stress intensity factors;
determining a remaining usage life value for an input probability value based on the probabilistic representation, wherein the remaining usage life value comprises a value of the probabilistic representation at the input probability value;
determining fuzzy number bounds based on the remaining usage life value and a future uncertainty adjustment factor;
performing probability assignments based on the fuzzy number bounds;
determining minimum and maximum remaining usage life values associated with the input confidence level based on the probability assignments; and
providing the remaining usage life value and the minimum and maximum remaining usage life values to a condition based maintenance system, wherein a maintenance schedule for the aircraft component determined by the condition based maintenance system is influenced by the remaining usage life value and the minimum and maximum remaining usage life values.

* * * * *